United States Patent Office.

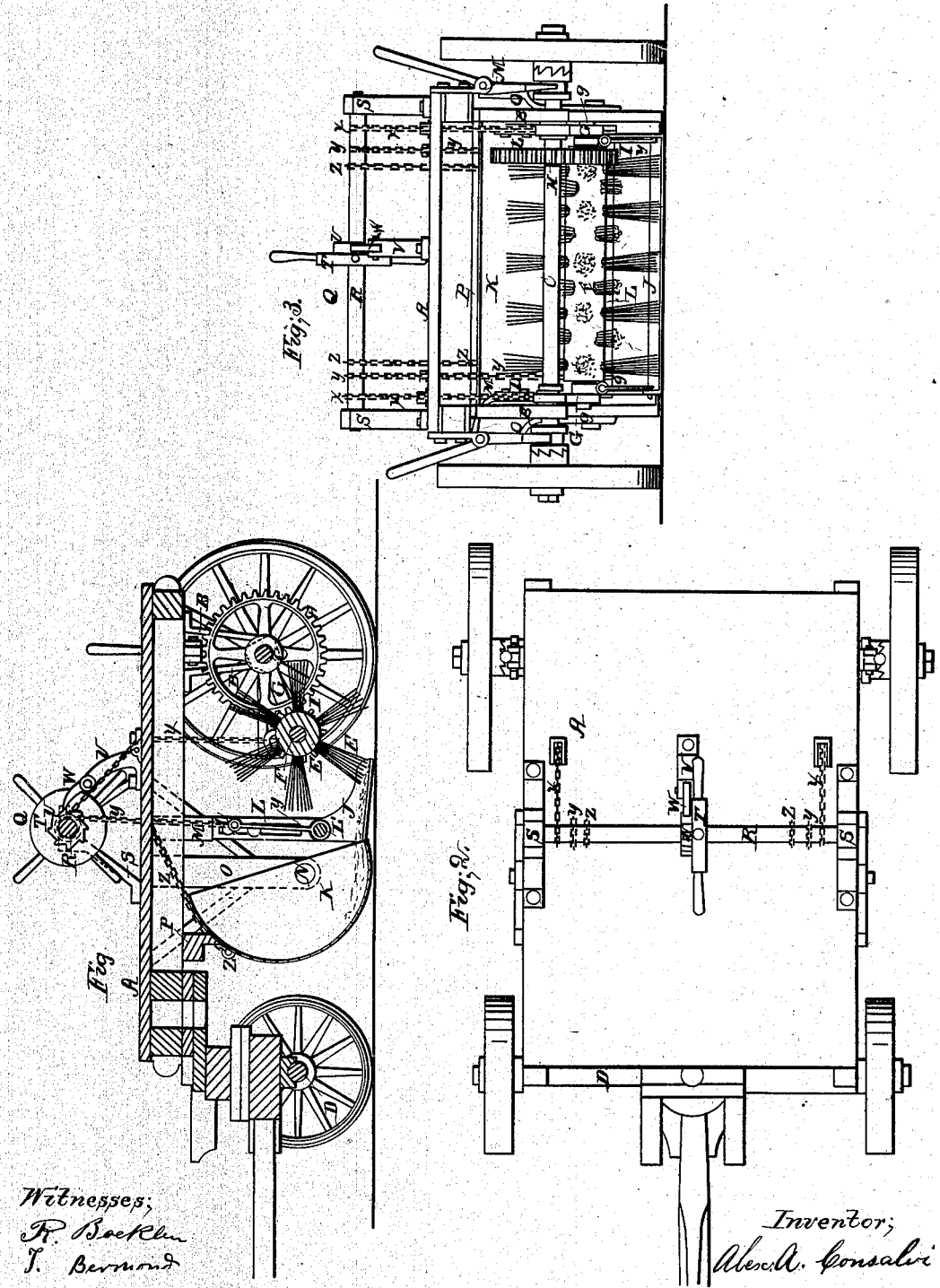

ALEXANDER A CONSALVI, OF NEW YORK, N. Y.

Letters Patent No. 104,707, dated June 28, 1870; antedated June 13, 1870.

---

IMPROVED STREET-SWEEPING MACHINE.

---

The Schedule referred to in these Letters Patent and making part of the same

---

*To all whom it may concern:*

Be it known that I, ALEXANDER A. CONSALVI, of the city, county, and State of New York, have made certain new and useful Improvements in Street-sweeping Machines; and I do hereby declare that the following is a full, clear, and exact description of the same, reference being had to the accompanying drawing and letters of reference marked thereon, the same making part of this specification, in which—

Figure 1 represents a vertical longitudinal section of a street-sweeping machine with my improvements.

Figure 2 represents an end view of the same.

Figure 3, a top view of the same.

Similar letters of reference indicate corresponding parts in the several figures.

This invention consists in the construction, arrangement, and combination of parts, as hereinafter set forth.

To enable others skilled in the art to make and use my improvements, I will proceed to describe their details and operation.

A represents the platform, which is supported in the bearings B B of the hind axle C, and upon the fifth-wheel and front axle D; and the hind axle C is provided with the usual clutches and clutch-levers for disengaging the hind wheels from their axle when the machine is not in use, or brought from place to place or to the place of operation.

E represents the broom or sweeper, the axle F of which rests in bearings G G, which both are supported and swing on the hind axle with their rear ends, and the rotation of said broom is obtained in the usual way, by means of a gear-wheel, H, upon the hind axle, and a pinion, I, upon the shaft of the broom.

J represents the pan, or dirt-receiver, upon which the dirt is elevated by the broom, and K the dumping-box, on which the dirt collects and is dumped.

The forward end of the pan J is hinged to vertical sliding bars, L L, by means of a fulcrum-bar, L', while its rear end is suspended on the shaft or bearings of the broom, and the said sliding bars L L are attached to stationary vertical bars, M M, secured to the side of the platform, as clearly shown.

The dumping-box K is of semicircular form, has its fulcrum on the bolts or studs N N of the hangers O O, which are suspended and secured on the side of the platform, and P is a resting-block, against which the said dumping-box stops while receiving the dirt.

Now, in order to raise or lower the broom and pan and operate the dumping-box together, whenever required, I employ the windlass Q, which has the winding-arbor or shaft R, arranged horizontally in bearings, S S, secured upon the platform of the machine, and has upon the said shaft a hand-wheel, T, and a ratchet-wheel, U, and upon the platform is secured a standard V, which supports a pawl, W, arranged to operate on the said ratchet-wheel, and to the said shaft R I attach the ends of three chains or ropes, X Y Z, on each side of the machine, and, the loose ends of the chains X X, I attach to the bearings G G of the sweeper or broom, the said bearings being provided with proper hooks or eyes for that purpose.

The loose ends of the chains Y Y, I secure to the fulcrum-bar L' of the pan J, and the loose ends of the chains Z Z, I attach to the forward side of the dumping-box, so that, by means of turning the hand-wheel T, the said chains all wind up upon the shaft R, and raise, consequently, the broom as well as the pan, and turn, also, the dumping-box to perform the dumping of the dirt; or, if the pawl W is disengaged from the ratchet, the pan and broom are lowered, and the dumping-box turned in position for operation.

From the foregoing, it will be clearly perceived that the operation of the machine is greatly simplified, and one operator may manipulate the machine.

I do not claim the employment of a windlass in street-sweeping machines, for raising the broom and receiver, as this is not new; but having fully described my invention,

What I claim therein, and desire to secure by Letters Patent, is—

The combination of the eccentrically-pivoted and semicircular receiver K, the pan J, adapted to be raised and lowered, and the rotary sweeper F E, all connected with a windlass, R, by chains X Y Z, when said parts are arranged as shown, and are constructed to operate substantially as herein described.

ALEX. A. CONSALVI.

Witnesses:
T. BERMOND,
R. BOEKLEY.